(12) United States Patent
Halberstadt et al.

(10) Patent No.: US 8,874,435 B2
(45) Date of Patent: Oct. 28, 2014

(54) AUTOMATED GLOSSARY CREATION

(75) Inventors: Benjamin Halberstadt, Jerusalem (IL);
Roger K. Hecker, Efrat (IL); Erel Sharf, Modiin (IL)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 13/448,481

(22) Filed: Apr. 17, 2012

(65) Prior Publication Data

US 2013/0275125 A1     Oct. 17, 2013

(51) Int. Cl.
*G06F 17/21* (2006.01)
(52) U.S. Cl.
USPC ...................................... 704/10; 704/1; 704/9
(58) Field of Classification Search
USPC .................................................. 704/1, 9, 10
See application file for complete search history.

(56) References Cited

U.S. PATENT DOCUMENTS

| | | | |
|---|---|---|---|
| 6,212,494 B1 * | 4/2001 | Boguraev | 704/9 |
| 7,266,548 B2 | 9/2007 | Weare | |
| 7,296,229 B2 * | 11/2007 | Berstis | 715/259 |
| 7,860,873 B2 | 12/2010 | Campbell | |
| 7,870,016 B2 | 1/2011 | Fazal et al. | |
| 7,873,670 B2 * | 1/2011 | Statchuk | 707/796 |
| 7,885,918 B2 * | 2/2011 | Statchuk | 707/603 |
| 2002/0198739 A1 * | 12/2002 | Lau et al. | 705/3 |
| 2004/0133418 A1 * | 7/2004 | Turcato et al. | 704/9 |
| 2005/0222893 A1 | 10/2005 | Kasravi et al. | |
| 2006/0224617 A1 * | 10/2006 | Inmon | 707/102 |
| 2008/0027971 A1 | 1/2008 | Statchuk | |
| 2008/0243488 A1 * | 10/2008 | Balmelli et al. | 704/10 |
| 2010/0299288 A1 * | 11/2010 | Gruber | 706/12 |
| 2013/0158982 A1 * | 6/2013 | Zechner et al. | 704/9 |

OTHER PUBLICATIONS

Carney, J. G, "Industry models for enterprise data management in financial markets", IBM Journal of Research and Development, vol. 54 Issue2, Mar.-Apr. 2010.

Muller et al., "The TaxGen Framework: Automating the Generation of a Taxonomy for a Large Document Collection", Proceedings of the 32nd Annual Hawaii International Conference on System Sciences, 1999. HICSS-32, 1999.

* cited by examiner

*Primary Examiner* — Douglas Godbold
(74) *Attorney, Agent, or Firm* — Janaki K. Davda; Konrad, Raynes, Davda & Victor LLP (57) ABSTRACT

A method for creating a glossary of terms, the method including identifying data labels in a computer-based document set, tracing any of the data labels to a computer-readable data source external to the computer-based document set, identifying as synonyms different data labels that are traceable to the same data source, and storing any of the data labels in a computer-readable data store.

21 Claims, 6 Drawing Sheets

Base Product Weekly Tally

| LastName | Workplace |
|---|---|
| <Workplace> | <Workplace> |
| <LastName> | <Workplace> |
| <LastName> | <Workplace> |
| <LastName> | |

312

| | Data Item | |
|---|---|---|
| ⊞ Data Item | | |
| | Type | |
| | Name | LastName |
| | Label | |
| | Expression | [MtH].[Person].[LastName] — 304 |
| | Aggregate Function | None |
| | Rollup Aggregate Function | None |
| | Solve Order | |
| ⊞ Data Item | | |
| | Type | |
| | Name | Workplace |
| | Label | |
| | Expression | [MtH].[Person].[Workplace] |
| | Aggregate Function | Total |
| | Rollup Aggregate Function | Automatic |
| | Solve Order | |

Base Product Weekly Tally — 316

| LastName | Workplace |
|---|---|
| Grove | 8 |
| Jermaine | 4 |
| Kendal | 7 |
| Maine | 6 |
| Miller | 3 |
| Mustang | 4 |
| Peri | 5 |
| Randal | 1 |
| Russel | 2 |
| Trevor | 2 |

US 8,874,435 B2

AUTOMATED GLOSSARY CREATION

FIELD OF THE INVENTION

The invention relates in general to computer-based systems and methods for creating glossaries of terms.

BACKGROUND OF THE INVENTION

Large business enterprises typically use a variety of independent computer-based software applications to capture and store business data. Data warehousing applications are often used to consolidate information from such applications, where specifications known as Business Intelligence (BI) report definitions are used to generate a variety of BI reports from such data for review by management or other parties. While different enterprise units may draw from the same enterprise data when creating BI report definitions, they are often free to use different labels for the same data in the resulting reports, as different enterprise units may employ different terminology. For example, a sales department might refer to "Total Sales" whereas an accounting department might refer to the same data as "Total Revenue."

Large business enterprises are also often required by government regulation to implement certain data management practices, such as to improve the quality of the data they are required to provide to various government agencies or other parties. To support this, large business enterprises will typically develop a glossary of business terms, including a precise definition of each term. This glossary is then used by all parties in the enterprise to ensure there is a common understanding of these business terms when providing data as part of regulation compliance. For example, if different enterprise units are to contribute data to support a report on the enterprise's "forecast net present value," an enterprise-wide glossary of business terms may be used by all data contributors to ensure that they all have the same understanding of this term, and therefore provide the correct data.

SUMMARY OF THE INVENTION

In one aspect of the invention a method is provided for creating a glossary of terms, the method including identifying data labels in a computer-based document set, tracing any of the data labels to a computer-readable data source external to the computer-based document set, identifying as synonyms different data labels that are traceable to the same data source, and storing any of the data labels in a computer-readable data store.

In other aspects of the invention systems and computer program products embodying the invention are provided.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
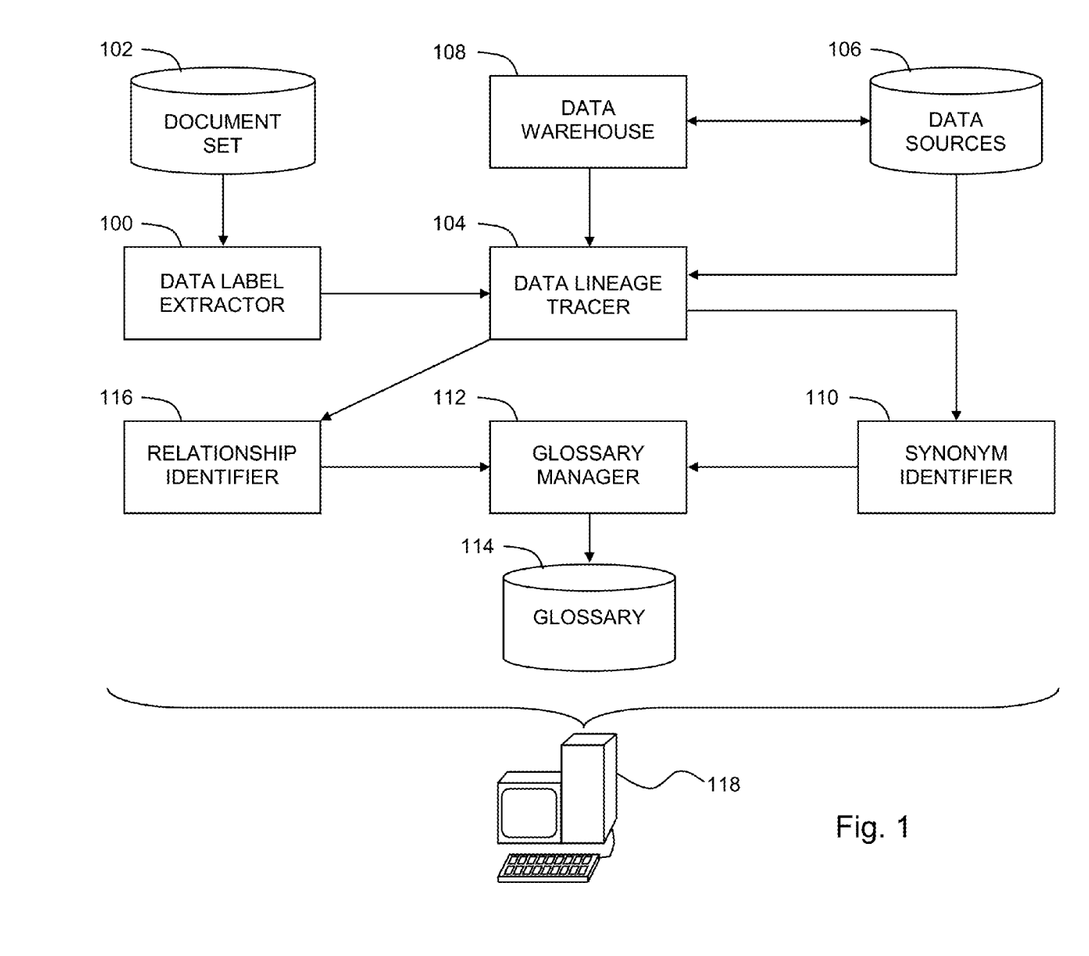
FIG. 1 is a simplified conceptual illustration of a system for creating a glossary of terms, constructed and operative in accordance with an embodiment of the invention.

Reference is now made to FIG. 1, which is a simplified conceptual illustration of a system for creating a glossary of terms, constructed and operative in accordance with an embodiment of the invention. In the system of FIG. 1, a data label extractor 100 is configured to identify data labels in a computer-based document set 102, such as where computer-based document set 102 includes any number of business intelligence (BI) report definitions and/or reports generated using BI report definitions. A data lineage tracer 104 is configured to determine the data lineage of any data label identified by data label extractor 100 within computer-based document set 102 by tracing the data associated with the data label to one or more computer-readable data sources 106 that are external to computer-based document set 102. Data lineage tracer 104 preferably determines data lineage using conventional techniques, or may otherwise receive data lineage information, such as from a data warehouse 108 that is associated with data sources 106.

A synonym identifier 110 is configured to identify as synonyms any identified data labels that are traceable to the same data sources 106. Synonym identifier 110 is optionally configured to determine which data label, within any group of data labels that are mutually synonymous, occurs most frequently in computer-based document set 102. A glossary manager 112 is configured to store any of the data labels in a glossary 114, which may be stored on a computer-readable data storage medium. Glossary manager 112 preferably stores any data labels for which no synonyms have been identified. For any group of data labels that are mutually synonymous, glossary manager 112 preferably stores only the data label synonym group member that occurs most frequently in computer-based document set 102, and does not store the other data label synonym group members. Alternatively, for any group of data labels that are mutually synonymous, glossary manager 112 preferably stores any of the data label synonym group members together with an indicator indicating that the data label is a member of the synonym group, as well as an indicator indicating which data label synonym group member occurs most frequently in computer-based document set 102.

A relationship identifier 116 is configured to identify relationships between any identified data labels in accordance with predefined relationship criteria. For any group of data labels that are mutually related, glossary manager 112 preferably stores in glossary 114 any of the related data label group members together with an indicator indicating that the data label is a member of a relationship group, as well as a description of the relationship.

Any of the elements shown in FIG. 1 are preferably implemented by one or more computers, such as a computer 118, by implementing the elements in computer hardware and/or in computer software embodied in a non-transient, computer-readable medium in accordance with conventional techniques.

Figure 2:
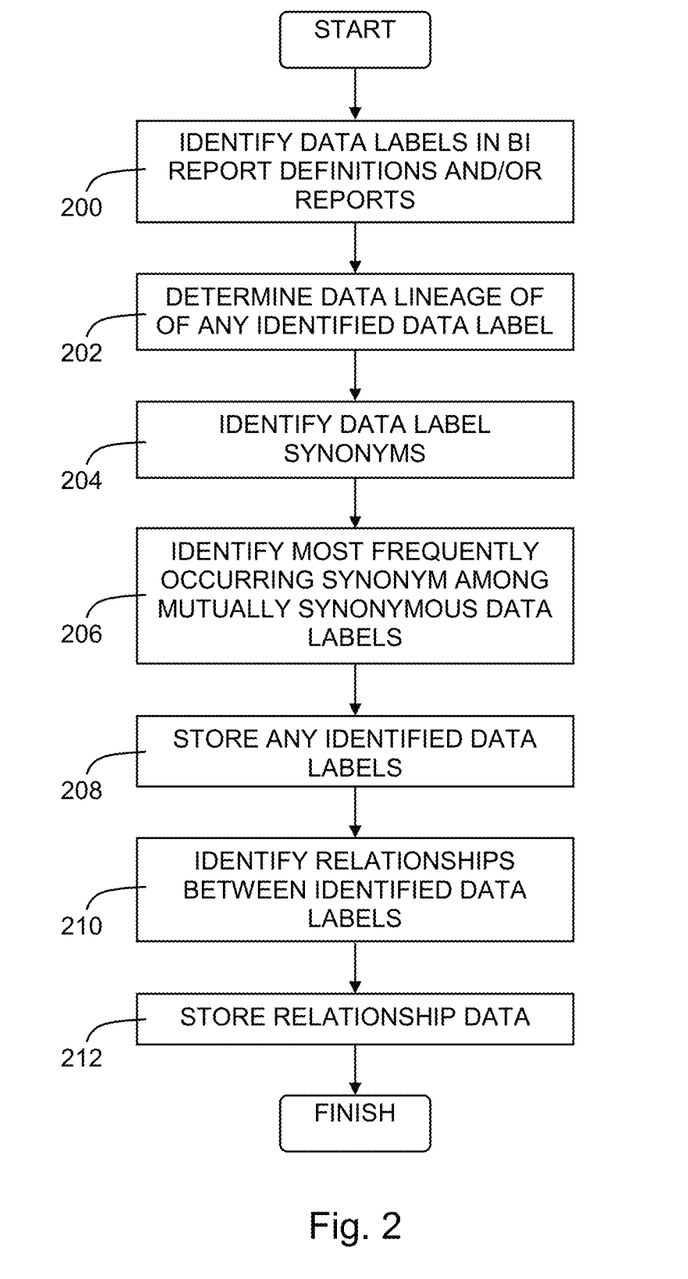
FIG. 2 is a simplified flowchart illustration of an exemplary method of operation of the system of FIG. 1, operative in accordance with an embodiment of the invention.

Reference is now made to FIG. 2, which is a flowchart illustration of an exemplary method of operation of the system of FIG. 1, operative in accordance with an embodiment of the invention. In the method of FIG. 2, data labels in a computer-based document set are identified, such as where the computer-based document set includes any number of business intelligence (BI) report definitions and/or reports generated using BI report definitions (step 200). The data lineage of any identified data label is determined by tracing the data associated with the data label to one or more computer-readable data sources that are external to the computer-based document set (step 202). Data labels that are traceable to the same data sources are identified as synonyms (step 204). For any group of data labels that are mutually synonymous, the data label synonym group member that occurs most frequently in the computer-based document set is identified (step 206). Any identified data labels are stored in a glossary on a computer-readable data storage medium (step 208), which may include data labels for which no synonyms have been identified, and for any group of data labels that are mutually synonymous, only the data label synonym group member that occurs most frequently in the computer-based document set, or any of the data label synonym group members together with an indicator indicating that the data label is a member of the synonym group, as well as an indicator indicating which data label synonym group member occurs most frequently in the computer-based document set. Relationships between any data labels are identified in accordance with predefined relationship criteria (step 210). For any group of data labels that are mutually related, any of the related data label group members are stored, such as in the glossary, together with an indicator indicating that the data label is a member of a relationship group, as well as a description of the relationship (step 212).

Figure 3A:
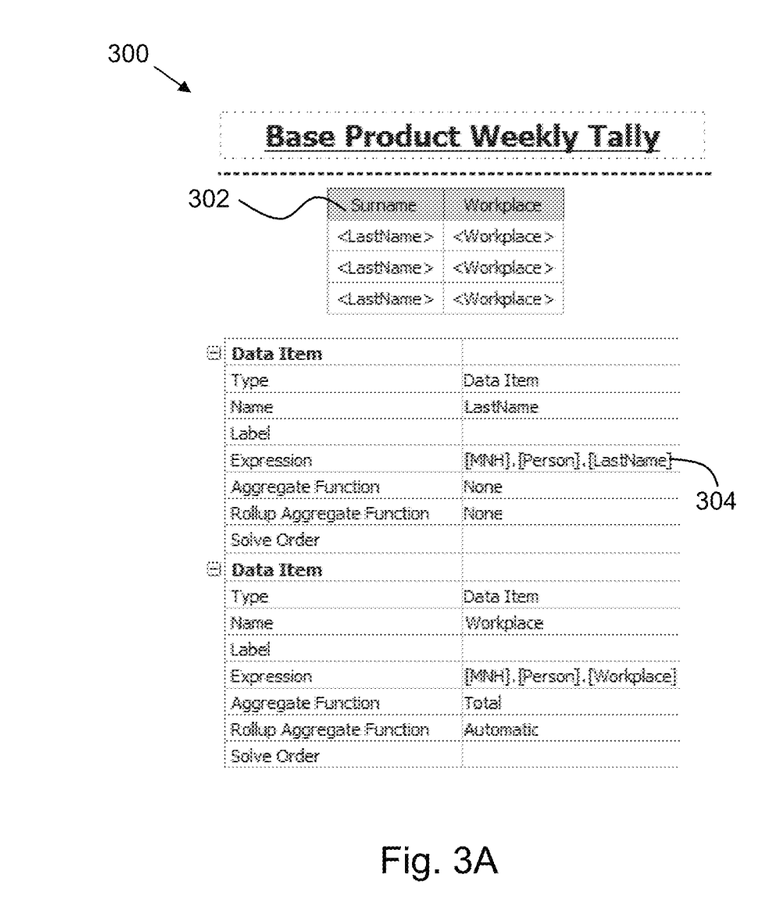
FIGS. 3A-3E are exemplary BI report definitions and reports corresponding thereto, useful in understanding the invention.
Figure 3B:
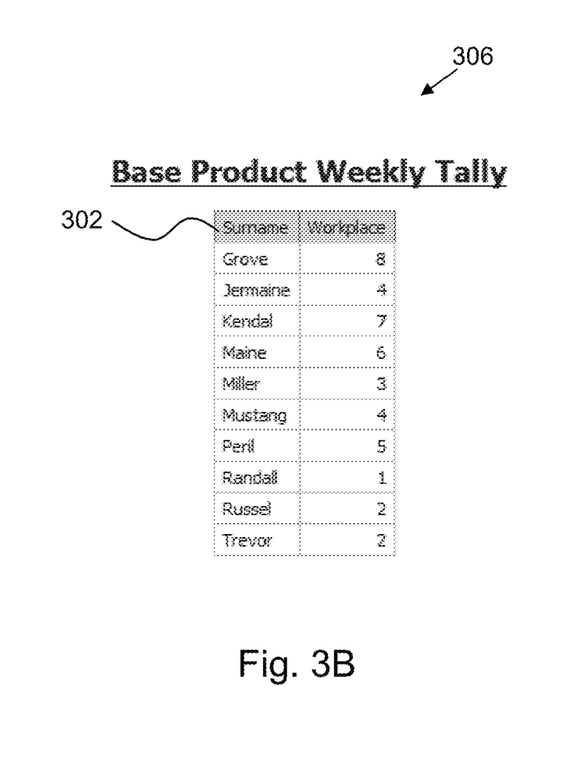
Figure 3C:
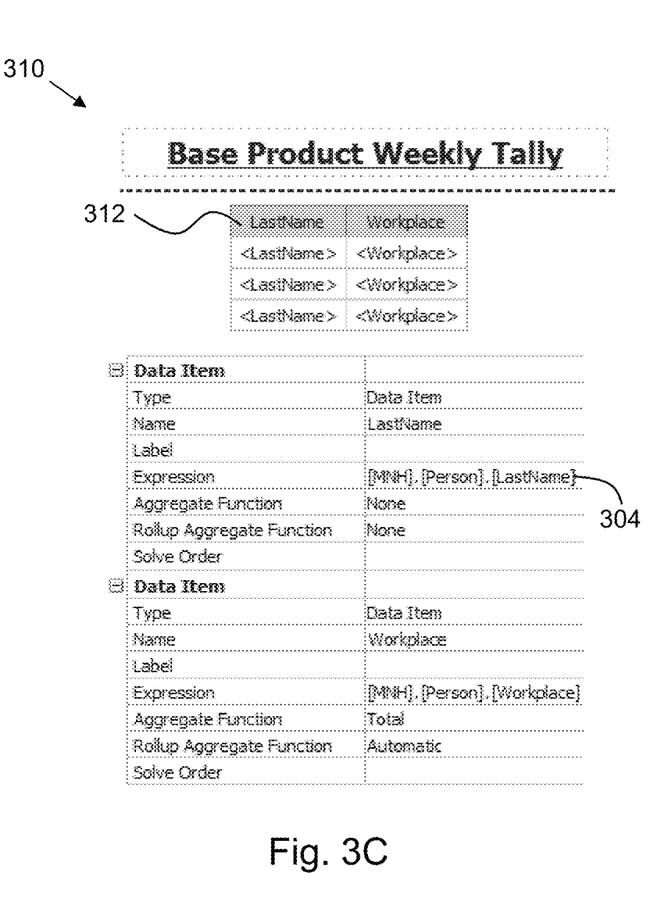
Figure 3D:
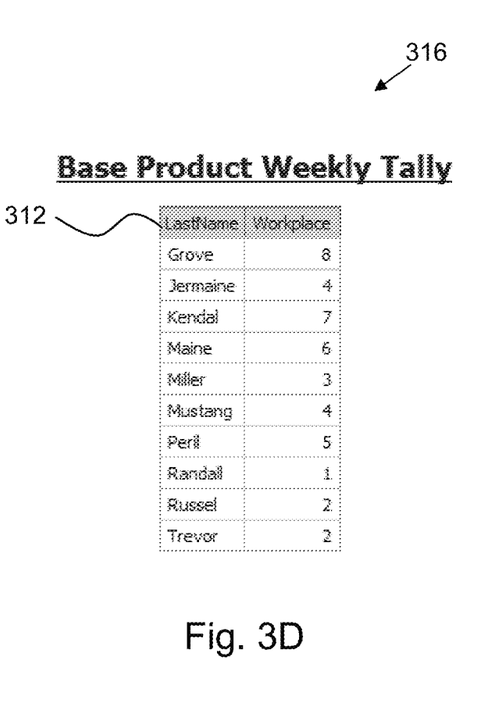

Reference is now made to FIGS. 3A-3E, which are exemplary BI report definitions and reports corresponding thereto, useful in understanding the invention. In FIG. 3A a BI report definition 300 is shown including a data label 302 of "Surname" whose data lineage is traced to a data source 304 of "[MNH].[Person].[LastName]". FIG. 3B shows a report 306 generated using BI report definition 300, where report 306 includes a column in which data label 302 and data associated with data label 302 appear. In FIG. 3C a BI report definition 310 is shown including a data label 312 of "LastName" whose data lineage is also traced to data source 304 of "[MNH].[Person].[LastName]". FIG. 3D shows a report 316 generated using BI report definition 310, where report 316 includes a column in which data label 312 and data associated with data label 312 appear. Since data label 302 in BI report definition 300 and data label 312 in BI report definition 310 trace to the same data source 304 of "[MNH].[Person].[LastName]", they are mutually synonymous, and either or both of data labels 302 and 312 may be stored in a glossary as described hereinabove.

Figure 3E:
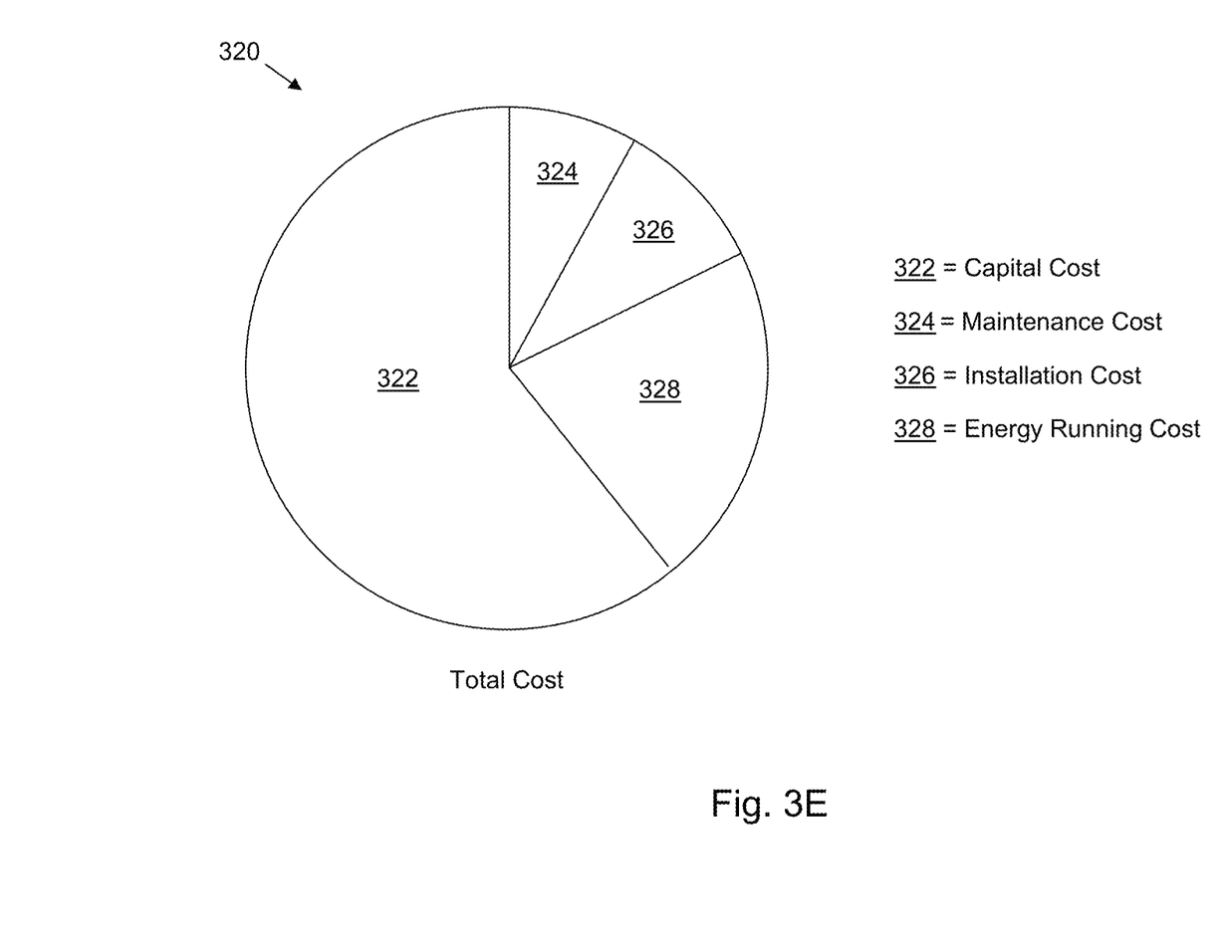

In FIG. 3E a report is shown including a pie chart 320 divided into regions 322, 324, 326, and 328. In accordance with the present invention the data labels "Total Cost," "Capital Cost," "Maintenance Cost," "Installation Cost," and "Energy Running Cost" are identified, and it is determined that the relationship between the identified data labels is that "Total Cost" represents the sum of "Capital Cost," "Maintenance Cost," "Installation Cost," and "Energy Running Cost". Any of the data labels may be stored in a glossary together with this relationship information.

Figure 4:
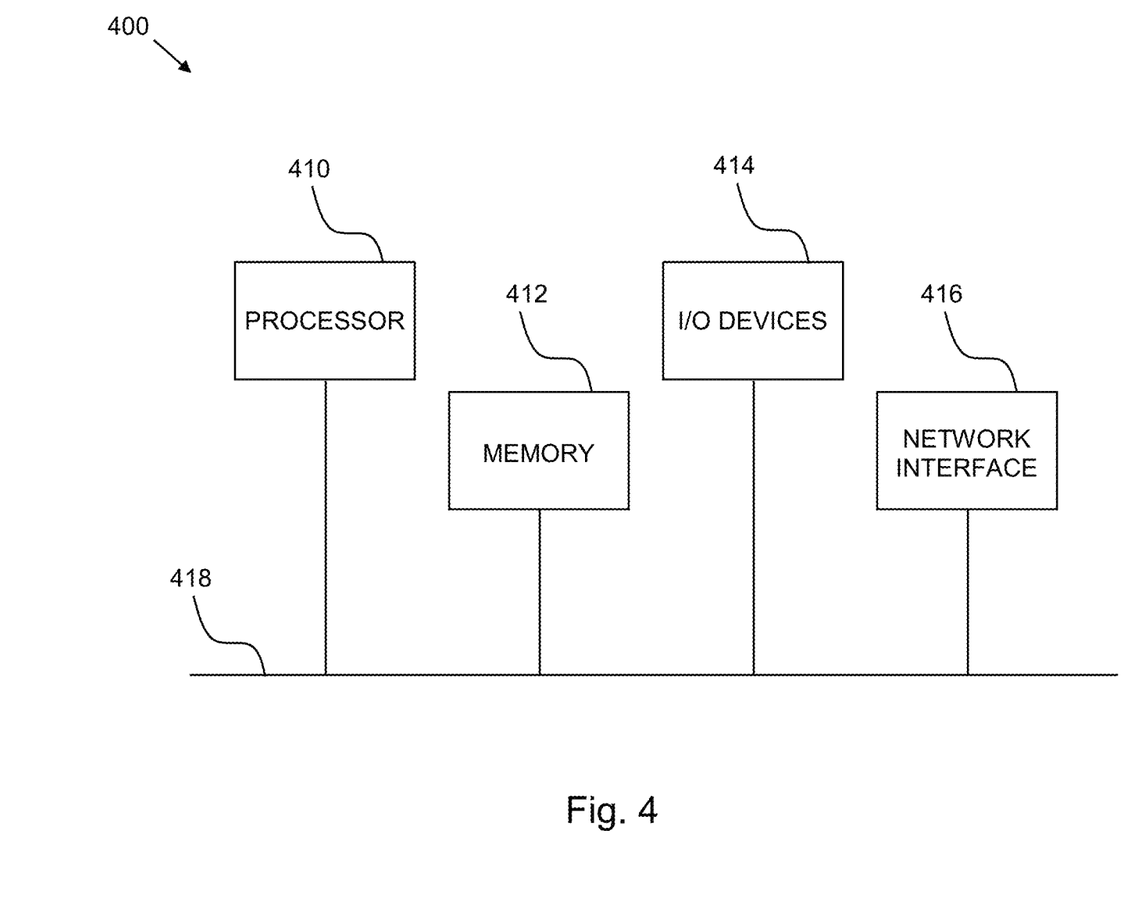
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3E) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for creating a glossary of terms, the method comprising:
    identifying, with a processor of a computer, a plurality of data labels in a computer-based document set;
    tracing, with the processor of the computer, any of the data labels to a computer-readable data source external to the computer-based document set;
    identifying, with the processor of the computer, as synonyms a plurality of different ones of the data labels that are traceable to the same data source; and
    storing, with the processor of the computer, any of the data labels in a computer-readable data store.

2. The method of claim 1 wherein the storing comprises:
    for any plurality of the data labels that are synonyms,
        determining which of the data label synonyms occurs most frequently in the computer-based document set,
        selecting one of the data label synonyms that occurs most frequently in the computer-based document, and
        storing only the selected data label synonym in the data store to the exclusion of the other data label synonyms.

3. The method of claim 1 wherein the storing comprises:
    for any plurality of the data labels that are synonyms,
        determining which of the data label synonyms occurs most frequently in the computer-based document set, and
        storing the data label synonyms in the data store together with
            an indicator indicating that the data label synonyms are synonyms, and
            an indicator indicating which of the data label synonyms occurs most frequently in the computer-based document set.

4. The method of claim 1 wherein the identifying a plurality of data labels comprises identifying wherein the computer-based document set includes a business intelligence (BI) report definition.

5. The method of claim 1 wherein the identifying a plurality of data labels comprises identifying wherein the computer-based document set includes a report generated using a business intelligence (BI) report definition.

6. The method of claim 1 and further comprising identifying a relationship between any of the data labels.

7. The method of claim 6 and further comprising storing in the computer-readable data store a) an indicator indicating that any of the data labels has a relationship with any other of the data labels, and b) a description of the relationship.

8. A system for creating a glossary of terms, the system comprising:
 a data label extractor configured to identify a plurality of data labels in a computer-based document set;
 a data lineage tracer configured to trace any of the data labels to a computer-readable data source external to the computer-based document set;
 a synonym identifier configured to identify as synonyms a plurality of different ones of the data labels that are traceable to the same data source; and
 a glossary manager configured to store any of the data labels in a computer-readable data store.

9. The system of claim 8 wherein, for any plurality of the data labels that are synonyms,
 the synonym identifier is configured to determine which of the data label synonyms occurs most frequently in the computer-based document set, and
 the glossary manager is configured to
  select one of the data label synonyms that occurs most frequently in the computer-based document, and
  store only the selected data label synonym in the data store to the exclusion of the other data label synonyms.

10. The system of claim 8 wherein, for any plurality of the data labels that are synonyms,
 the synonym identifier is configured to determine which of the data label synonyms occurs most frequently in the computer-based document set, and
 the glossary manager is configured to store the data label synonyms in the data store together with
  an indicator indicating that the data label synonyms are synonyms, and
  an indicator indicating which of the data label synonyms occurs most frequently in the computer-based document set.

11. The system of claim 8 wherein the computer-based document set includes a business intelligence (BI) report definition.

12. The system of claim 8 wherein the computer-based document set includes a report generated using a business intelligence (BI) report definition.

13. The system of claim 8 and further comprising a relationship identifier configured to identify a relationship between any of the data labels.

14. The system of claim 13 wherein the glossary manager is configured to store in the computer-readable data store a) an indicator indicating that any of the data labels has a relationship with any other of the data labels, and b) a description of the relationship.

15. A computer program product for creating a glossary of terms, the computer program product comprising:
 a computer-readable storage medium; and
 computer-readable program code embodied in the computer-readable storage medium, where the computer-readable program code is configured to
  identify a plurality of data labels in a computer-based document set,
  trace any of the data labels to a computer-readable data source external to the computer-based document set,
  identify as synonyms a plurality of different ones of the data labels that are traceable to the same data source, and
  store any of the data labels in a computer-readable data store.

16. The computer program product of claim 15 wherein, for any plurality of the data labels that are synonyms, the computer-readable program code is configured to
 determine which of the data label synonyms occurs most frequently in the computer-based document set,
 select one of the data label synonyms that occurs most frequently in the computer-based document, and
 store only the selected data label synonym in the data store to the exclusion of the other data label synonyms.

17. The computer program product of claim 15 wherein, for any plurality of the data labels that are synonyms, the computer-readable program code is configured to
 determine which of the data label synonyms occurs most frequently in the computer-based document set, and
 store the data label synonyms in the data store together with
  an indicator indicating that the data label synonyms are synonyms, and
  an indicator indicating which of the data label synonyms occurs most frequently in the computer-based document set.

18. The computer program product of claim 15 wherein the computer-based document set includes a business intelligence (BI) report definition.

19. The computer program product of claim 15 wherein the computer-based document set includes a report generated using a business intelligence (BI) report definition.

20. The computer program product of claim 15 wherein the computer-readable program code is configured to identify a relationship between any of the data labels.

21. The computer program product of claim 20 wherein the computer-readable program code is configured to store in the computer-readable data store a) an indicator indicating that any of the data labels has a relationship with any other of the data labels, and b) a description of the relationship.

* * * * *